United States Patent

[11] 3,583,163

| [72] | Inventor | Horst Penner<br>Liebenau, Germany |
|---|---|---|
| [21] | Appl. No. | 826,880 |
| [22] | Filed | May 22, 1969 |
| [45] | Patented | June 8, 1971 |
| [73] | Assignee | Dynamit Nobel Aktiengesellschaft<br>Troisdorf, Germany |
| [32] | Priority | June 28, 1968 |
| [33] | | Germany |
| [31] | | P 17 51 617.5 |

[54] SOLID PROPELLANT ROCKET WITH HYDRAULIC MEDIUM INTERPOSED BETWEEN PROPELLANT CHARGE AND COMBUSTION CHAMBER
9 Claims, 1 Drawing Fig.

| [52] | U.S. Cl. | 60/255 |
|---|---|---|
| [51] | Int. Cl. | F02k 9/04 |

| [50] | Field of Search | 60/255;<br>198/58 A3 |
|---|---|---|

[56] References Cited
UNITED STATES PATENTS

| 2,986,001 | 5/1961 | Green | 60/225 |
|---|---|---|---|
| 2,996,879 | 8/1961 | Miller | 60/255 |
| 3,301,785 | 1/1967 | Ratliff et al. | 60/255 |
| 3,400,796 | 9/1968 | Savins et al. | 192/58A-3 |

*Primary Examiner*—Mark M. Newman
*Attorney*—Craig, Antonelli, Stewart & Hill

ABSTRACT: A rocket having a solid propellant charge disposed within a combustion chamber and a hydraulic medium disposed between the chamber and the surface of the propellant charge, wherein the hydraulic medium is preferably a Newtonian fluid.

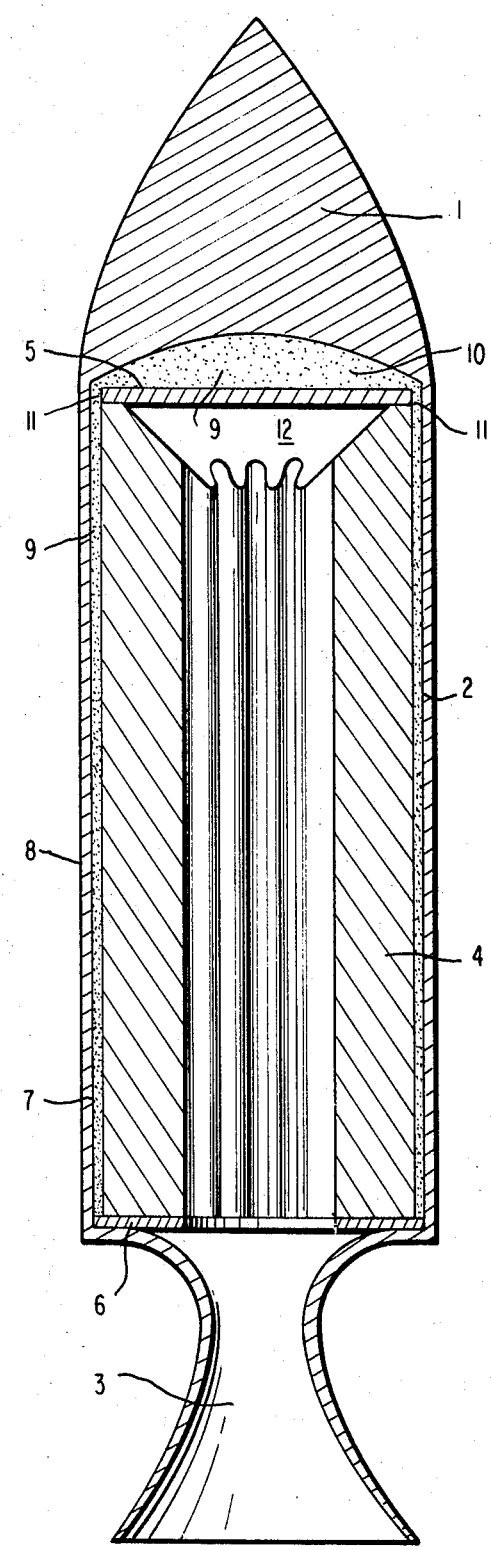

SOLID PROPELLANT ROCKET WITH HYDRAULIC MEDIUM INTERPOSED BETWEEN PROPELLANT CHARGE AND COMBUSTION CHAMBER

BACKGROUND OF THE INVENTION

In the technology dealing with solid-propellant-type rockets, wherein the solid propellant charge is disposed within a combustion chamber formed as an integral part of the projectile, it has heretofore been possible to effectively interconnect the solid propellant charge with the combustion chamber only when the coefficients of thermal expansion of the material of the combustion chamber and that of the propellant charge are approximately equal. Thus, for example, when the combustion chamber of the rocket is constructed from a synthetic resin material, An effective interconnection of the combustion chamber and the propellant charge disposed therein is feasible. However, the rocket engines more commonly is use today are provided with steel combustion chambers and solid propellant charges having mechanical properties similar to that of the customary synthetic resin. Thus, the respective coefficients of thermal expansion of the two different materials differ from one another by a magnitude greater than two powers of 10. In such circumstances, temperature variations of the engine frequently result in a detachment of the propellant charge from the combustion chamber and, ofttimes, in explosion of the engine.

It has been found desirable, for a number of reasons, however, to maintain an operative connection between the solid propellant charge and the surrounding combustion chamber. When an effective interconnection can be maintained, the entire rocket engine is provided with enhanced stability and rigidity flowing from the mutual support of the combustion chamber and the propellant charge. Further, the combustion chamber is effectively protected from attack by the hot combustion chamber gases by virtue of the buffering solid propellant charge. Effective seating of the solid propellant charge within the combustion chamber also precludes the necessity of extraneous structural members otherwise required for supporting the propellant charge within the chamber, centering the charge therein, and absorbing the initial acceleration forces during launching, since all of these functions are assumed by the combustion chamber itself. Additionally, effective interconnection of the solid propellant charge with the combustion chamber precludes the possibility of expulsion of the propellant charge insulation as the engine approaches cutoff. Upon ignition of the engine, the shocklike pressure stress upon the propellant charge is partially absorbed by the combustion chamber.

Accordingly, it is an object of the present invention to provide an effective interconnection of a solid rocket propellant charge with the combustion chamber of the rocket, to be effective even in situations wherein the respective coefficients of thermal expansion of the material of the combustion chamber and that of the propellant charge differ substantially from one another.

Further, it is an object of the present invention to provide a means for connecting the solid propellant charge with the combustion chamber of the rocket without requiring complicated and expensive extraneous structural members.

Finally, it is an object of the present invention to provide a solid propellant charge rocket of the type described hereinabove which, by virtue of a novel, though relatively simple and inexpensive construction, effectively avoids the disadvantages incorporated in all of the prior efforts to accomplish a similar objective.

SUMMARY OF THE INVENTION

The aforementioned objects, features and advantages are accomplished, in accordance with the present invention, by introducing into a gap formed between the wall of the combustion chamber and the surface of the solid propellant charge, a hydraulic medium capable of yielding without any appreciable energy requirements, to compensate for variations in the dimensions of the gap resulting from thermal or mechanical variations. The hydraulic medium, as contemplated by the present invention, communicates with a reservoir defined by the nose of the rocket and by a centering disc.

The hydraulic medium, in the sense in which it is employed in the present application, includes all liquids, fats, waxes and pastes, the consistency and viscosity of which can be varied by additives in any suitable manner. These additives can consist of decomposable substances, for example, ammonium oxalate, ammonium bicarbonate or the like; of inert, heat-resistant substances, such as the metallic oxides and silicates, for example, titanium oxides, aluminum oxides or asbestos; or of liquid substances solidifying under heat, for example, water glass (sodium silicate).

The composition of the hydraulic medium employed can be such that a substance having a high viscosity which thoroughly wets the surfaces of the combustion chamber wall and of the propellant charge is employed. Further, the composition of the hydraulic medium may be such that it exhibits relatively small resistance forces during slow dimensional variations, but relatively large resistance forces during rapid dimensional variations. Alternatively, the present invention contemplates that the hydraulic medium employed can be a nonflammable, decomposable substance which emits relatively little smoke and which solidifies, crystallizes or hardens in the heat produced by the combustion chamber gases, thus forming a coating of low conductivity which serves to protect the combustion chamber wall from the combustion gases.

Thus, it may be seen that by virtue of the present invention, it is now practically feasible to retain solid rocket propellant charges within steel combustion chambers without the necessity of any additional structural elements and to transmit the takeoff acceleration forces to the combustion chamber and to protect the combustion chamber wall from attack by the hot combustion gases during burning of the propellant charge.

BRIEF DESCRIPTION OF THE DRAWING

The aforementioned objects, features and advantages of the present invention will become more readily apparent from a consideration of the detailed description hereinbelow, when considered in conjunction with the accompanying drawing, which is a diagrammatic representation of a sectional view of a rocket provided with an internal burner solid propellant charge.

DETAILED DESCRIPTION OF THE DRAWING

The nose 1, the combustion chamber 2, and the nozzle 3 of the illustrated rocket are constructed conventionally. The propellant charge 4 is retained within the combustion chamber 2 by means of centering discs 5 and 6. The gap 7 between the propellant charge 4 and the wall 8 of the combustion chamber 2 is filled with a hydraulic medium 9 having a relatively high viscosity, for example, fats, pastes, waxes or the like, which medium thoroughly wets the surfaces of the propellant charge 4 and of the combustion chamber 2 and prevents the penetration of hot combustion chamber gases into the gap 7.

The propellant charge 4 is disposed within the combustion chamber 2 such that during temperature variations of the engine, whereby volumetric variation of the gap 7 is caused, the hydraulic medium 9 can either flow off into a reservoir 10 defined by the nose 1 of the rocket and disc 5, or the medium 9 can flow from the reservoir 10 into the gap 7 to completely fill same. In order to facilitate flow of the hydraulic medium 9, the centering disc 5, which, together with the nose 1, defines the reservoir 10, is provided with a number of apertures 11. Additionally, the disc 5 is constructed as a flexible membrane or diaphragm which can bulge out in the direction of the compensation space 12 upon heating up of the propellant charge 4 and upon overflow of the hydraulic medium 9 attendant thereto. Preferably, the hydraulic medium 9 is a newtonian fluid, such that its rheological behavior conforms to the newtonian law of fluid flow. Thus, during the thermal expansion processes which proceed slowly due to thermal inertia, the hydraulic medium 9 in gap 7 exhibits only relatively low resistance forces. On the other hand, during the ignition processes which take place very rapidly, the hydraulic medium 9 exhibits a relatively large resistance such that under extreme conditions the medium acts practically as a solid. Accordingly, in the latter case, the impact of ignition is fully transmitted to the wall 8 of the combustion chamber and the propellant charge 4 is thus relieved of this stress.

It should be readily apparent that solid inhibitors of the propellant charge 4 can be omitted at those points of the propellant charge covered by the hydraulic medium.

Although the present invention has been described with reference to but a single embodiment, it is to be understood that the scope of the invention is not limited to the specific details thereof, but is susceptible of numerous changes and modifications as would be apparent to one with normal skill in the pertinent technology.

I claim:

1. A solid-propellant-type rocket, comprising combustion chamber means, solid propellant charge means disposed within said combustion chamber means such that a gap is formed between the surface of said charge means and said combustion chamber means, a hydraulic medium disposed within said gap and reservoir means in communication with said gap adapted to retain a varying volume of said hydraulic medium as the volumetric capacity of said gap varies in response to thermal and/or mechanical factors, a nose portion having a hollow portion in the region thereof adjacent said combustion chamber means, and centering disc means disposed between said charge means and said hollow portion of said nose portion, said disc means and said nose portion together defining said reservoir means, said centering disc means being interposed between said gap and said reservoir means and provided with aperture means adapted to selectively permit passage of said hydraulic medium therethrough, wherein said charge means includes a hollow portion in the region thereof adjacent said nose portion and said centering disc means is constructed in the form of a flexible membrane capable of deforming concavely into said hollow portion of said charge means when said reservoir means is overfilled.

2. A rocket according to claim 1, wherein said hydraulic medium is a substance having a relatively high viscosity, adapted to thoroughly wet the surfaces of said combustion chamber means and thoroughly charge means.

3. A rocket according to claim 1, wherein said hydraulic medium includes at least one additive selected from the group consisting of ammonium oxalate and ammonium bicarbonate.

4. A rocket according to claim 1, wherein said hydraulic medium includes at least one additive selected from the group consisting of metallic oxides and silicates.

5. A rocket according to claim 4, wherein said additive is titanium oxide, aluminum oxide or asbestos.

6. A rocket according to claim 1, wherein said additive is sodium silicate.

7. A rocket according to claim 1, wherein said hydraulic medium exhibits the properties of a newtonian fluid.

8. A rocket according to claim 1, wherein said combustion chamber means and said charge means are constructed from materials having respective coefficients of thermal expansion differing substantially.

9. A rocket according to claim 8, wherein said respective coefficients of thermal expansion differ by a magnitude of at least two powers of 10.